United States Patent [19]

Luzzi

[11] 4,099,870

[45] Jul. 11, 1978

[54] OPTICAL PROBE FOR THE MEASUREMENT OF SPEEDS IN A FLUID FLOW

[75] Inventor: Antoine Luzzi, Echirolles, France

[73] Assignee: Societe General de Constructions Electriques et Mecaniques Alsthom s.a., Paris, France

[21] Appl. No.: 775,679

[22] Filed: Mar. 8, 1977

[30] Foreign Application Priority Data

Mar. 12, 1976 [FR] France .................................. 76 07161

[51] Int. Cl.² ................................................ G01P 3/36
[52] U.S. Cl. ......................................... 356/28; 350/301
[58] Field of Search ............................ 356/28; 250/356; 350/301

[56] References Cited

U.S. PATENT DOCUMENTS

| | | | |
|---|---|---|---|
| 3,448,406 | 6/1969 | McClure | 73/194 |
| 3,548,655 | 12/1970 | Rudd | 356/28 |
| 3,895,872 | 7/1975 | Dandliker et al. | 356/28 |
| 3,953,126 | 4/1976 | Kim et al. | 356/28 |
| 3,984,685 | 10/1976 | Fletcher et al. | 356/28 |

OTHER PUBLICATIONS

Huffaker; Applied Optics, vol. 9, No. 5, May 1970.

*Primary Examiner*—S. C. Buczinski
*Attorney, Agent, or Firm*—Sughrue, Rothwell, Mion, Zinn and Macpeak

[57] ABSTRACT

A probe comprises a sealed first tube part terminating at one end in a window with an open support extending away from the window and constituting an extension of the tube and carrying a reflection device such that incident light beams passing through the window and onto the reflector are reflected to converge on a measurement point within the open support intermediate of the reflector and window. A light detection device within the sealed tube protects the variations of light on the measurement point.

3 Claims, 3 Drawing Figures

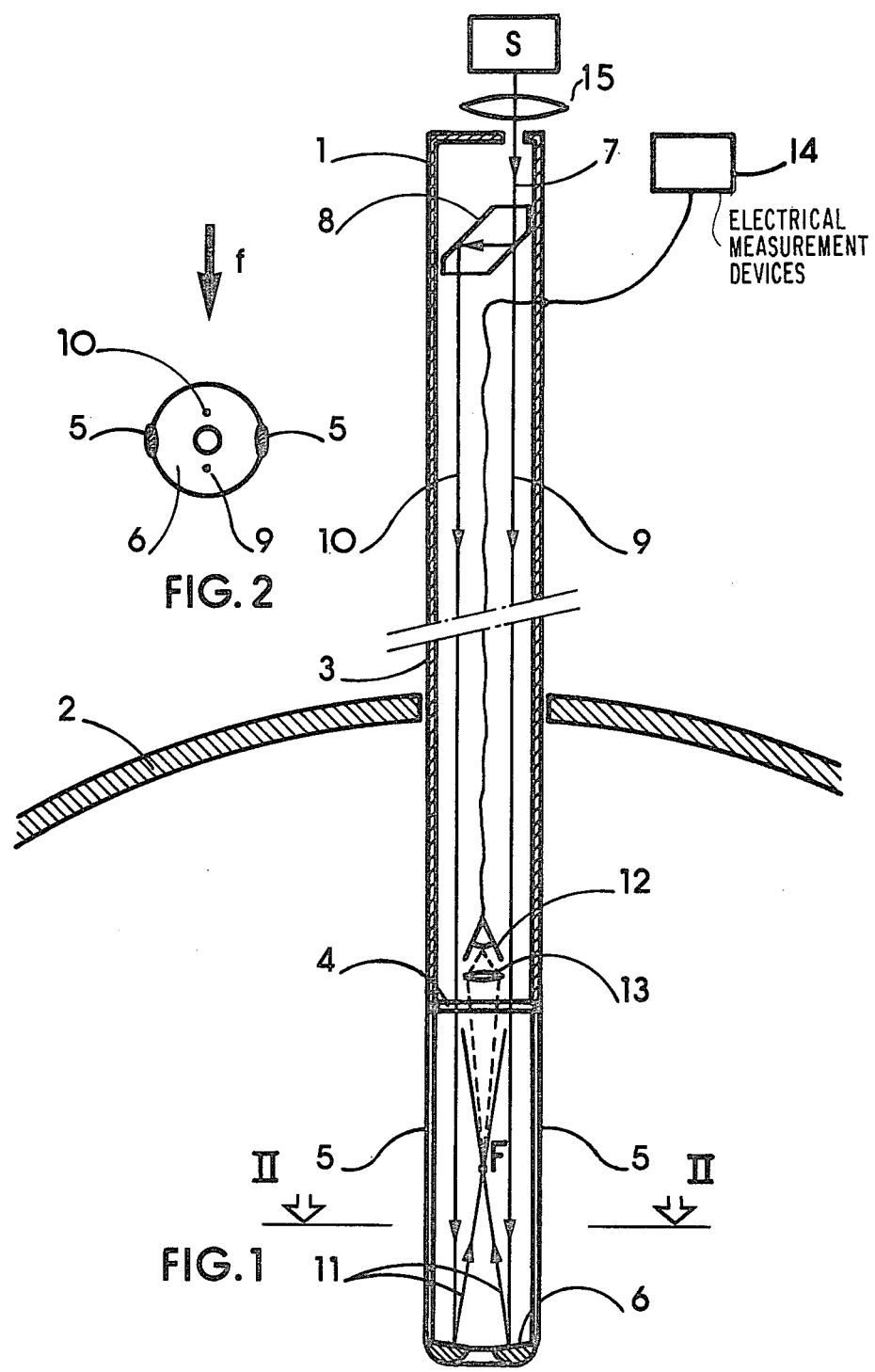

OPTICAL PROBE FOR THE MEASUREMENT OF SPEEDS IN A FLUID FLOW

FIELD OF THE INVENTION

The present invention relates to a probe for measuring particle speeds in a fluid flow. There are two optical methods which are used for measuring the average speed components and the turbulence characteristics at a point in a fluid flow without disturbing the flow at the measurement point and with good accuracy.

The first method is based on the Doppler effect. The incident light beam is divided into two beams by beams of a separator. One of these beams is focussed at the flow measurement point. The light diffused by particles suspended in the fluid flowing through the measuring point, has differing wavelengths as a function of the flow speed and is received in one direction and combined with the second beam of original light. A photo detector transforms the light signal into an electric signal whose frequency is proportional to the speed of flow at the measurement point.

In the second method, the incident light beam is separated into two beams of equal intensity by means of a separator. These beams are combined and a network of fringes parallel to one another is formed in a measurement zone. When a particle in suspension in the fluid flow passes in front of these fringes, it periodically produces a surplus of diffused light, and the total of the diffused light transmitted to a laterally placed receiver fluctuates.

The frequency of this fluctuation depends on the spacing of the fringes which can easily be calculated and on the speed of the particle.

These two methods can enable two-dimensional or three-dimensional measurements by a change of position of the incident beams.

SUMMARY OF THE INVENTION

The invention relates to an improved device for implementing these two methods, constituted by a probe for insertion in the flow, the probe comprising along its length a first sealed part and a second part separated from the first by a sealed window, this second part being constituted by a support having at its end a reflector which receives the incident light beams for performing the measurement and which reflects them so that they converge and intersect at the measurement point inside said second part of the probe, a light detection device placed outside this second part of the probe making it possible to detect the variations of light at the measurement point and to deduce therefrom the component of the speed at said measurement point.

This detection effected at the intersection point of the incident beams after their reflection on an optical system makes it possible to avoid the attenuation of the reflected light and consequently to obtain a direct measurement signal having a much higher maximum intensity than in conventional retrodiffusion systems.

Further, as the complete optical system is included inside a one-piece assembly constituted by a probe, it enables the pre-adjustement of the assembly, so that measurements can be made at any point of the flow simply by moving the probe.

An embodiment of a probe is described hereinbelow by way of example with reference to the accompanying drawings.

BRIEF DESCRIPTION OF THE DRAWINGS

FIG. 1 is a schematic axial cross-section of a probe for measurements by the fringe method;

FIG. 2 is a transversal cross-section along line II—II of FIG. 1, and

DESCRIPTION OF THE PREFERRED EMBODIMENTS

Figure 3:
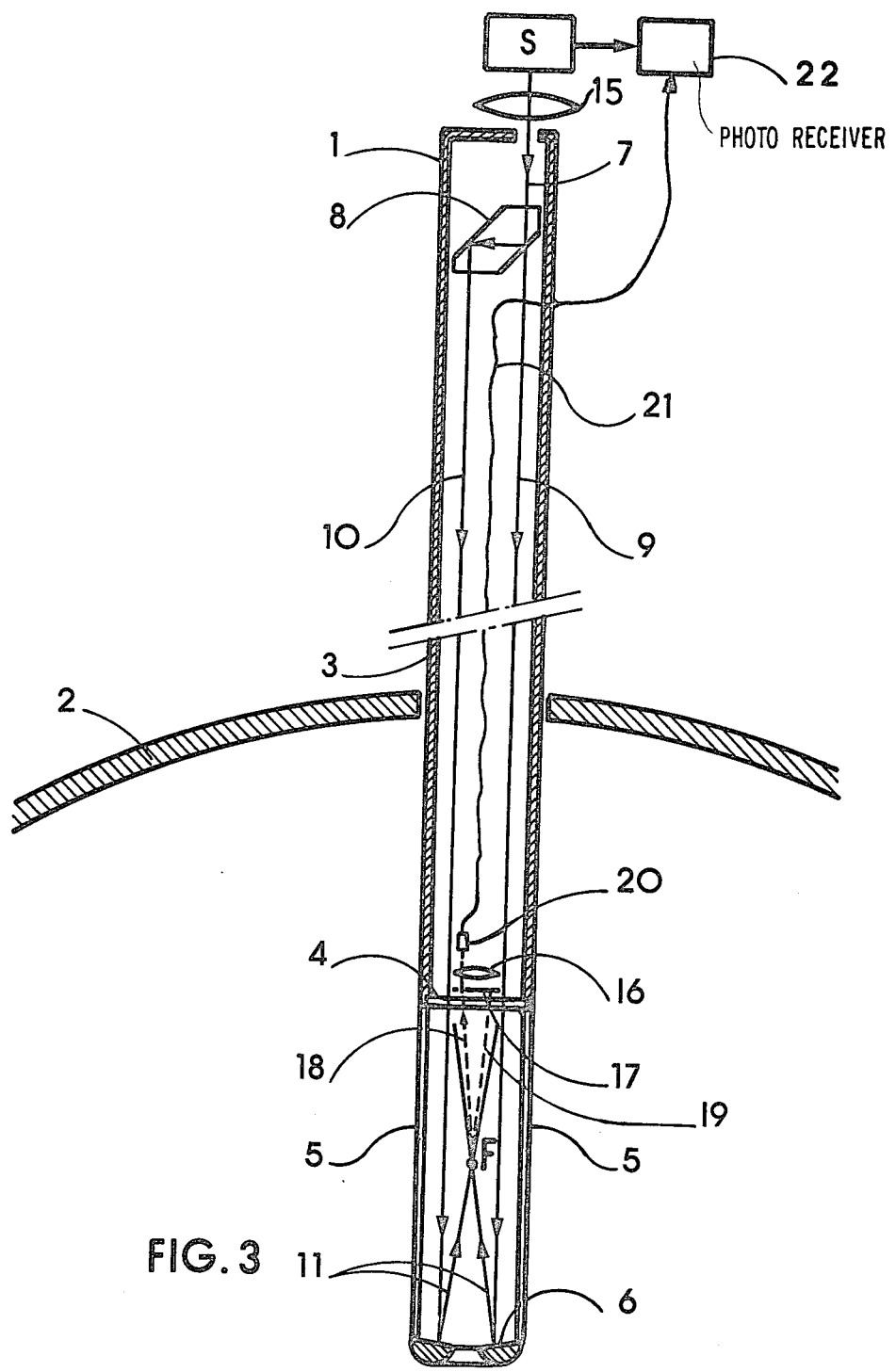
FIG. 3 is a schematic axial cross-section of a probe for measurements by the Doppler method.

FIGS. 1 and 2 show a probe 1 placed in a flow of fluid $f$ in a tube 2. This probe is constituted by a tube 3 having a window 4 inserted in a fluid-tight manner at the end of said tube 3, and by a support formed by two rods 5 carrying at their end a mirror 6 whose reflecting surface is turned towards the inside of the probe.

These rods 5 are shaped so as not to disturb the flow and have an oval cross-section which is shown in FIG. 2.

A monochromatic light source S emits an incident beam 7 which is separated by a biprism 8 into two beams 9 and 10 which propagate along the probe 1 in the direction of the arrows, to pass through the window 4 and be reflected at the mirror 6 which has a profile such that the reflected beams 11 intersect one another at a predetermined fixed point F.

When the probe is inserted in the flow $f$, it is positioned in such a way that the intersection point F is at the precise point of the flow where the measurement of the flow speed is to be made.

A network of fringes which are parallel to one another is then formed at the point F. When a particle in suspension in the flow $f$ passes into the network of fringes, it produces a periodic surplus of light which is detected by a photodetector 12 after having passed through a focussing lens 13. The focussing lens 13 only takes into consideration light which is contained in a cone inscribed inside the reflected rays 11 (i.e. the reflected rays 11 miss the lens 13) and focusses light from the particles in the fringes on to the photo-detector 12 which is connected to electrical measurement devices 14 which make it possible to determine the cross-fringe component of the flow speed at the point F.

In one embodiment, the light received by the lens 13 could be focussed on the ends of optical fibres which would be connected to a photodetector placed outside the probe.

It will be advantageous in the case where the probe is very long to place a lens 15 to prevent the divergence of the incident beams 9 and 10, this lens being such that it effects the focussing of said beams in the vicinity of the point F.

FIG. 3 shows a probe according to the invention for measuring a flow speed by the optical method based on the Doppler effect.

This embodiment shows the same probe configuration, with its sealed tube 3, the two supports 5, the sealed window 4 and the incident beams 9 and 10 which are reflected on the mirror 6, to intersect at the measuremnt point F.

In the case of measurement by the Doppler method the lens 13 for focussing on the photodetector 12 is replaced by a lens 16 preceded by a mask 17 so as to receive and focus only one scattered beam 18 onto the end 20 of an optical fibre 21, the cone of reflected light and the second scattered beam 19 being stopped by the mask 17.

The component of the flow speed at the point F could then be known by measuring the difference between the frequency of the direct incident light S and the light of the beam 18 transmitted by the optical fibre 21 in a photo-receiver 22.

What is claimed is:

1. A device for optical measurement of local speed and turbulence in a fluid flow by the method based on the Doppler effect or the interference fringe method, said device comprising:

a probe for insertion in the flow, said probe comprising a first sealed tube part having one end immersed in said flow, a sealed window within said one end, means for transmitting incident light through said first part and said window, a second, open support part forming an extension of said first tube part and extending within said flow beyond said window, a reflector at the end of said second support part for receiving said incident light beams emanating from said window and for reflecting said light beams directly back towards said window and causing them to converge and intersect at a measurement point between said reflector and said window, within said open support part and to pass through said window into said first sealed tube part, and a light detection device positioned within said first tube part in the path of reflected light beams converging at said measurement point for detecting variations of light at the measurement point and to deduce therefrom the component of speed of said flow at said measurement point.

2. A device according to claim 1, for optical measurement by the fringe method, further comprising a focussing lens within said first sealed tube part for receiving reflected light contained in a cone inscribed within the reflected beams and focussing it on the light detection device.

3. A device according to claim 1, for optical measurement by the method based on the Doppler effect, said device further comprising a focussing lens within said first sealed tube part, preceded by a mask so as to receive and focus only one reflected beam on the detection device with the other reflected beam being stopped by said mask.

* * * * *